(12) United States Patent
Sendonaris

(10) Patent No.: US 7,092,459 B2
(45) Date of Patent: Aug. 15, 2006

(54) FREQUENCY TRACKING USING PILOT AND NON-PILOT SYMBOLS

(75) Inventor: Andrew Sendonaris, San Jose, CA (US)

(73) Assignee: Qualcomm, Incorporated, San Diego, CA (US)

( * ) Notice: Subject to any disclaimer, the term of this patent is extended or adjusted under 35 U.S.C. 154(b) by 615 days.

(21) Appl. No.: 10/006,903

(22) Filed: Nov. 8, 2001

(65) Prior Publication Data

US 2003/0087620 A1    May 8, 2003

(51) Int. Cl.
*H04L 27/14* (2006.01)
(52) U.S. Cl. .................................... 375/326
(58) Field of Classification Search ........ 375/130–147, 375/148, 344, 326, 327; 455/132–137; 370/320, 370/342, 335
See application file for complete search history.

(56) References Cited

U.S. PATENT DOCUMENTS

| | | | | |
|---|---|---|---|---|
| 5,602,833 A * | 2/1997 | Zehavi | ........................ | 370/209 |
| 5,649,000 A * | 7/1997 | Lee et al. | ..................... | 455/436 |
| 5,960,040 A * | 9/1999 | Cai et al. | ..................... | 375/279 |
| 6,088,402 A * | 7/2000 | White | ........................ | 375/326 |
| 6,134,215 A * | 10/2000 | Agrawal et al. | ............ | 370/209 |
| 6,327,534 B1 * | 12/2001 | Levanon et al. | ............ | 701/215 |
| 6,498,805 B1 * | 12/2002 | Brown et al. | ................ | 375/147 |
| 6,520,448 B1 * | 2/2003 | Doty et al. | ................ | 244/3.23 |
| 6,608,858 B1 * | 8/2003 | Sih et al. | .................... | 375/147 |
| 6,633,616 B1 * | 10/2003 | Crawford | .................... | 375/326 |
| 6,704,555 B1 * | 3/2004 | Sih et al. | ................. | 455/245.1 |
| 6,728,301 B1 * | 4/2004 | Chrisikos | .................... | 375/147 |
| 2001/0014114 A1 * | 8/2001 | Baltersee et al. | ........... | 375/148 |
| 2002/0018518 A1 * | 2/2002 | Subramanian et al. | ...... | 375/147 |
| 2003/0053528 A1 * | 3/2003 | Wang | ......................... | 375/150 |
| 2003/0086481 A1 * | 5/2003 | Sih et al. | .................... | 375/147 |
| 2003/0210667 A1 * | 11/2003 | Zhengdi | ..................... | 370/335 |
| 2004/0013209 A1 * | 1/2004 | Zehavi et al. | ............... | 375/334 |

FOREIGN PATENT DOCUMENTS

| | | |
|---|---|---|
| EP | 1107524 | 11/2000 |
| WO | 0149000 | 7/2001 |

OTHER PUBLICATIONS

Choi, et al., *Multipath CDMA Channel Estimation by jointly utilizing pilot and traffic channels*: IEEE Proceedings: Communications, Institution of Electrical Engineers vol. 146:5 (1999).

* cited by examiner

*Primary Examiner*—Emmanuel Bayard
(74) *Attorney, Agent, or Firm*—Philip R. Wadsworth; Charles D. Brown; Alex C. Chen

(57) ABSTRACT

In one embodiment, the invention is directed toward frequency tracking techniques using control symbols that include both pilot and non-pilot symbols. For example, both the pilot and non-pilot symbols can be used in estimating frequency error of a received signal. The contribution of non-pilot symbols to the estimation can be weighted according to a confidence level associated with each non-pilot symbol. In some cases, soft decisions are generated for the non-pilot symbols and then used with the pilot symbols for frequency tracking. In this manner, the frequency tracking loop can be improved.

29 Claims, 9 Drawing Sheets

FREQUENCY TRACKING USING PILOT AND NON-PILOT SYMBOLS

FIELD

The invention relates generally to wireless communication, and more particularly to frequency tracking in a wireless communication system.

BACKGROUND

A number of different wireless communication techniques have been developed, including frequency division multiple access (FDMA), time division multiple access (TDMA) and various spread spectrum techniques. One common spread spectrum technique used in wireless communication is code division multiple access (CDMA) signal modulation in which multiple communications are simultaneously transmitted over a spread spectrum radio-frequency (RF) signal. Some example wireless communication devices that have incorporated CDMA technology include cellular radiotelephones, PCMCIA cards incorporated within portable computers, personal digital assistants (PDAs) equipped with wireless communication capabilities, and the like.

In CDMA technology and other wireless communication technologies, frequency tracking loops are often implemented to monitor the frequency of received signals and adjust the signals accordingly. In particular, frequency errors (or frequency variations) often exist in the carrier signals received over forward or reverse links of the system. A forward link (sometimes referred to as a "downlink) refers to a signal sent from the base station to a wireless communication device (WCD). A reverse link (sometimes referred to as an "uplink") refers to a signal sent from the WCD to the base station.

There are generally two main causes of the errors that can contribute to unwanted frequency variation of a carrier signal. The first relates to what is commonly known as the "Doppler effect" or "Doppler shift." The Doppler effect manifests as a change in the frequency of a received signal due to a relative velocity between the transmitter and receiver. Thus, if a WCD is moving away from the base station as it transmits a signal over the reverse link, the base station receiver will receive a signal that has a lower frequency, i.e., longer wavelength, than the originally sent signal. Because WCDs are often used within vehicles or high speed transit systems, correcting for Doppler shifts can be an extremely important factor in maintaining a robust and effective wireless communication system.

The second cause of error that can contribute to unwanted frequency variation relates to variations between local clocks of the various devices in the wireless communication system. Each device in the system typically produces carrier signals using a frequency synthesizer that utilizes the local clock of the device as its timing reference. Each local clock, however, typically has an unknown timing error. WCDs, in particular, often implement relatively low-cost local clocks, such as voltage-controlled, temperature-compensated crystal oscillators (VCTCXO). These local clocks can introduce significant frequency errors in the carrier signal.

To account for frequency errors and adjust the signals accordingly, frequency tracking loops are often implemented within WCDs and base stations in wireless communication systems. For example, a frequency discriminator can be used to compute an estimate of the frequency error. In particular, the frequency discriminator calculates residual frequency error estimates and sends them to an accumulator that continuously accumulates the residual frequency error estimates to estimate the actual frequency error. The accumulated estimate is used by a rotator to adjust the frequency of the received signal accordingly, thus reducing the residual frequency error. The residual frequency error eventually converges to approximately zero, such that the accumulated estimate is approximately equal to the actual frequency error. In this manner, a feedback loop can correct for frequency errors in a received carrier signal.

There are generally three frequency tracking loop variables that characterize the performance of the frequency tracking loop: the time constant of the loop, the standard deviation of the residual frequency error, and the pull-in range. The time constant is an estimate or measure of the time it takes for the frequency tracking loop to reduce the residual frequency error to approximately zero after the loop has been initialized. Initialization of the loop can occur, for example, when a finger of a RAKE receiver is initially assigned to a path. The pull-in range is a strict upper bound defining the maximum residual frequency error that can be handled by the frequency tracking loop. For example, upon initialization, if the residual frequency error is greater than the pull-in range, the frequency tracking loop will not converge.

In general, it is advantageous to minimize the time constant, minimize the standard deviation of the residual frequency error, and maximize the pull-in range. In particular, the time constant and the standard deviation directly affect system performance in the sense that they affect the error rate of the system. The pull-in range typically limits the relative velocity at which a wireless communication device will still be able to effectively communicate in the system. Often, these three variables represent trade-offs to designers of wireless communication systems.

Pilot symbols are often used to estimate the residual frequency errors. Pilot symbols can be extracted from a received signal by demodulation, e.g., despreading and Walsh/OVSF decovering. Pilot symbols generally refer to the control symbols that have been conventionally used to facilitate system synchronization. Pilot symbols are typically transmitted over a control channel. To compute an estimate of the residual frequency error, a first pilot symbol can be cross-multiplied with the complex conjugate of a second pilot symbol to calculate phase rotation between the successive symbols. In this manner, an estimate of the residual frequency error can be obtained and then accumulated.

For some wireless communication systems, other control symbols, i.e., non-pilot symbols, have been implemented within the control channel to improve system performance. For example, in W-CDMA, both pilot symbols and non-pilot symbols are transmitted over the control channel. This presents challenges to the effective implementation of frequency tracking loops. In particular, achieving the desired design goals in W-CDMA for the standard deviation of the residual frequency error and the time constant can result in a small pull-in range. To compensate for this small pull-in range, complex searcher elements are conventionally required to search over multiple frequency offsets to ensure that the residual frequency error falls within the pull-in range. Still, even with these complex searcher elements, the frequency tracking loop may not converge if a wireless communication device is traveling at very high velocities, such as velocities associated with high speed transit systems.

SUMMARY

In general, the invention is directed to frequency tracking techniques using control symbols that include both pilot and non-pilot symbols. In particular, both the pilot and non-pilot symbols can be used in estimating the residual frequency error of a received signal. The contribution of non-pilot symbols to the estimation can be weighted according to a confidence level associated with each non-pilot symbol. In this manner, the frequency tracking loop can be improved.

Pilot symbols generally refer to control symbols that have been conventionally used to facilitate system synchronization, while non-pilot symbols refer to any of a number of other possible symbols such as transport format combination indicators (TFC symbols), transmit power control indicators (TPC symbols), feedback indicators (FBI symbols), or even data symbols transmitted on the control channel. The techniques according to the invention may involve calculating a cross-product associated with the control symbols to measure phase rotation between successive symbols. The pilot symbols can be used in calculating the cross-product. Non-pilot symbols, on the other hand, are first converted into soft decisions that incorporate both a decision as to the value associated with each non-pilot symbol and a confidence level indicating the confidence in the decision. The soft decisions can be used along with the pilot symbols in calculating the cross-product to measure phase rotation between successive symbols.

To measure phase rotation between successive symbols, a first set of symbols can be cross-multiplied with the complex conjugate of a second set of symbols. However, as mentioned, the non-pilot symbols are converted into soft decisions prior to being used in the cross-product calculation. In this manner, the effective contribution of non-pilot symbols to residual frequency error estimation can be weighted according to the confidence level associated with the non-pilot symbols. For example, non-pilot symbols received at lower signal-to-noise plus interference ratios can be given less weight to ensure that erroneous estimates will not undermine the effective implementation of the frequency tracking loop.

In exemplary embodiments, the invention is directed to one or more frequency tracking methods. For example, a method may include obtaining control symbols from a first wireless signal, wherein the control symbols include both pilot symbols and non-pilot symbols. The method may also include using both the pilot and non-pilot symbols for frequency tracking of the first wireless signal. In one particular embodiment, the method includes generating soft decisions for the non-pilot symbols. For example, each soft decision may incorporate a weight that indicates the confidence level associated with the soft decision. The pilot symbols and the soft decisions can then be used for frequency tracking of the first wireless signal.

The method can be implemented, for example, in various devices within a wireless communication system to improve frequency tracking within the system. For example, in some embodiments, the invention is directed to an apparatus that may form part of a base station, or alternatively, part of a wireless communication device (WCD) within the system. Notably, although many aspects of the invention are described herein in relation to frequency tracking within a base station, the invention is not limited in that respect. In some embodiments, the invention is directed to a wireless communication system implementing the frequency tracking techniques within a base station, a WCD, or even a number of base stations and WCDs.

The invention may be implemented in hardware, software, firmware, or any combination thereof. If implemented in software, the invention may be directed to a computer readable medium carrying program code, that when executed, performs one or more of the methods mentioned above.

The invention is capable of providing a number of advantages. For example, the invention can facilitate improved frequency tracking of signals that include both pilot and non-pilot symbols within the control channel. In particular, the frequency tracking loop can be improved by ensuring that the soft decisions associated with low confidence non-pilot symbols are given little or no weight, e.g., symbols received at relatively low power or low signal-to-noise-plus interference ratios.

Another advantage of the invention is that it can increase the pull-in range of the frequency tracking loop. For example, the use of the non-pilot symbols, and thus the elimination of gaps between any two successive symbols used in the frequency tracking loop, can facilitate an increase in the pull-in range. In particular, by using the non-pilot symbols, the frequency discriminator can implement a variety of different cross-product combinations, including new and inventive combinations, to effectively increase the pull-in range. This, in turn, can avoid the need for complex searcher elements which are conventionally used to ensure that residual frequency errors fed into the frequency tracking loop fall within the pull-in range. Moreover, this improvement may not negatively impact either the time constant or the standard deviation of the residual frequency error. In some cases, because non-pilot symbols are used in frequency tracking and no gaps are introduced to the frequency discriminator, the standard deviation of the residual frequency error can actually be decreased, thus improving the data error rate in the system.

In addition, the invention can be used to improve the trade-off between the pull-in range and the time constant of the frequency tracking loop. By increasing the pull-in range of the frequency tracking loop, the invention increases the margin between the pull-in range and the maximum residual frequency error. This, in turn, may result in a faster convergence of the frequency tracking loop, i.e., a reduction of the time constant of the frequency tracking loop.

Additional details of these and other embodiments are set forth in the accompanying drawings and the description below. Other features, objects and advantages will become apparent from the description and drawings, and from the claims.

DETAILED DESCRIPTION

In the description below, various aspects of the invention are described in terms of a wireless signal transmitted over a reverse link, such as from a wireless communication device (WCD) to a base station. In that case, the invention may involve frequency tracking of signals received by the base station. The invention, however, can also be implemented in other devices within the wireless communication system. For example, in some embodiments, the invention can be implemented in the WCD. In that case, the WCD would perform frequency tracking of signals sent from the base station. Accordingly, the description below is meant to be exemplary of frequency tracking techniques that can be used to improve frequency tracking within a wireless communication system.

Figure 1:
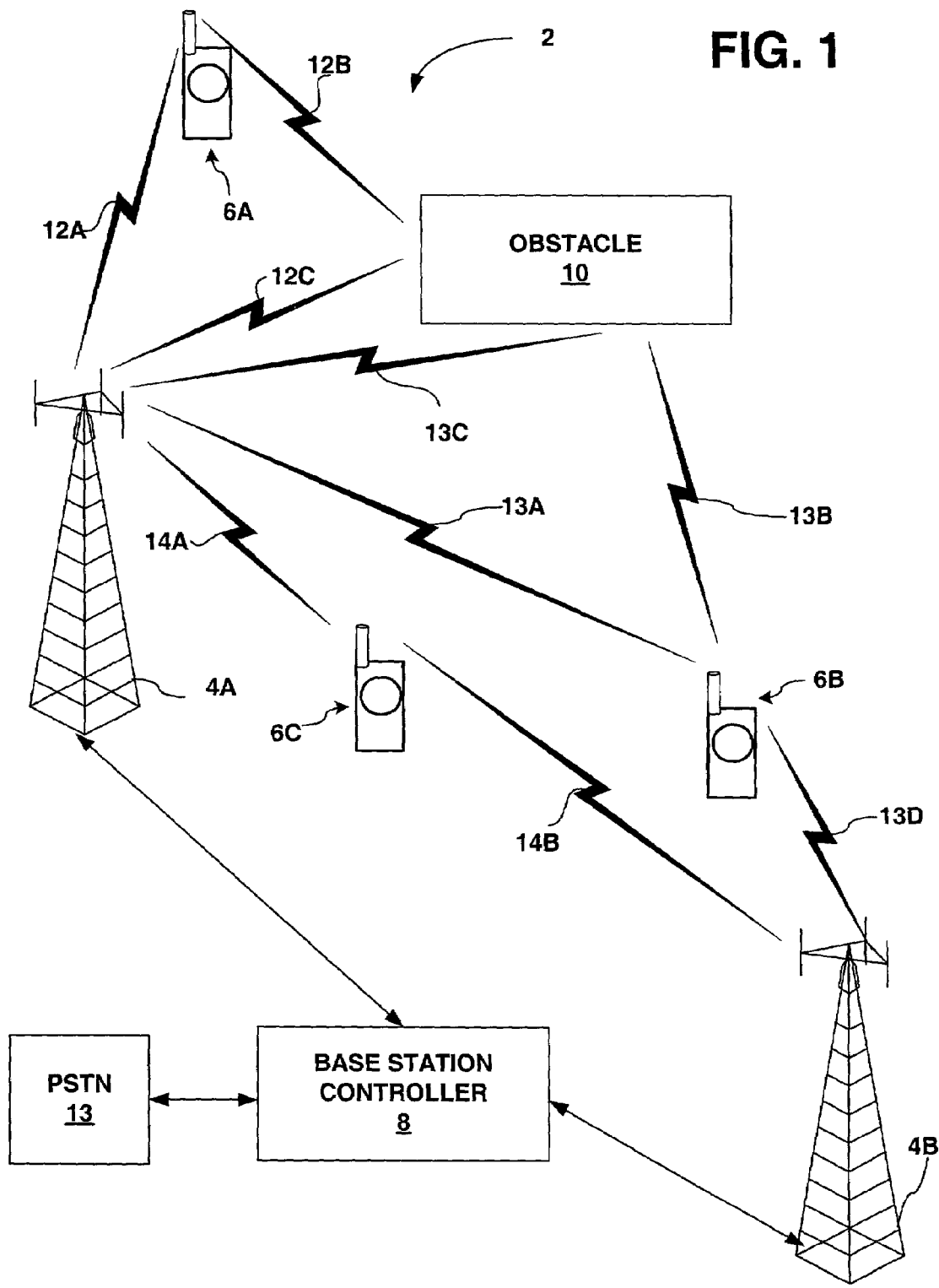
FIG. 1 is a block diagram illustrating a wireless communication system according to the invention.

FIG. 1 is a block diagram illustrating an exemplary spread spectrum wireless communication system 2, in which base stations 4 receive signals 12–14 from WCDs 6 via one or more paths. In particular, base station 4A receives signal 12A from WCD 6A via a first path, as well as signal 12C, via a second path caused by reflection of signal 12B from obstacle 10. Obstacle 10 may be any structure proximate to WCD 6A such as a building, bridge, car, or even a person.

Base station 4A also receives signal 13A from WCD 6B via a first path from WCD 6B, as well as signal 13C via a second path caused by reflection of signal 13B from obstacle 10. In addition, base station 4A receives signal 14A from WCD 14A. Base station 4A may implement what is referred to as a RAKE receiver to simultaneously track the different signals received from different WCDs and/or from the same WCD but via different paths. System 2 may include any number of WCDs and base stations. For example, as illustrated, another base station 4B receives signal 13D from WCD 6B. In addition, base station 4B receives signal 14B from WCD 6C.

Frequency errors often exist in the carrier signals received over forward or reverse links of system 2. For example, different frequency errors would typically exist in signals 12–14 sent over reverse links from WCDs 6 to base stations 4 because of variations in local clocks and the Doppler effect. To detect and correct for these frequency errors, bases stations 4 can implement the frequency tracking techniques described in greater detail below. Similarly, WCDs 6 can use the same frequency tracking techniques to detect and correct for frequency errors in signals received over a forward link (from the base station to the WCD).

Examples of WCD 6 include a cellular radiotelephone, a satellite radiotelephone, a PCMCIA card incorporated within a portable computer, a personal digital assistant (PDA) equipped with wireless communication capabilities, and the like. Base stations 4 (sometimes referred to as base transceiver systems BTS) are typically connected to a base station controller 8 to provide an interface between the base stations 4 and a public switched telephone network (PSTN) 13.

System 2 may be designed to support one or more CDMA standards including, for example, (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), (5) the HDR system documented in TIA/EIA-IS-856, "CDMA2000 High Rate Packet Data Air Interface Specification, and (6) some other standards.

Figure 2:
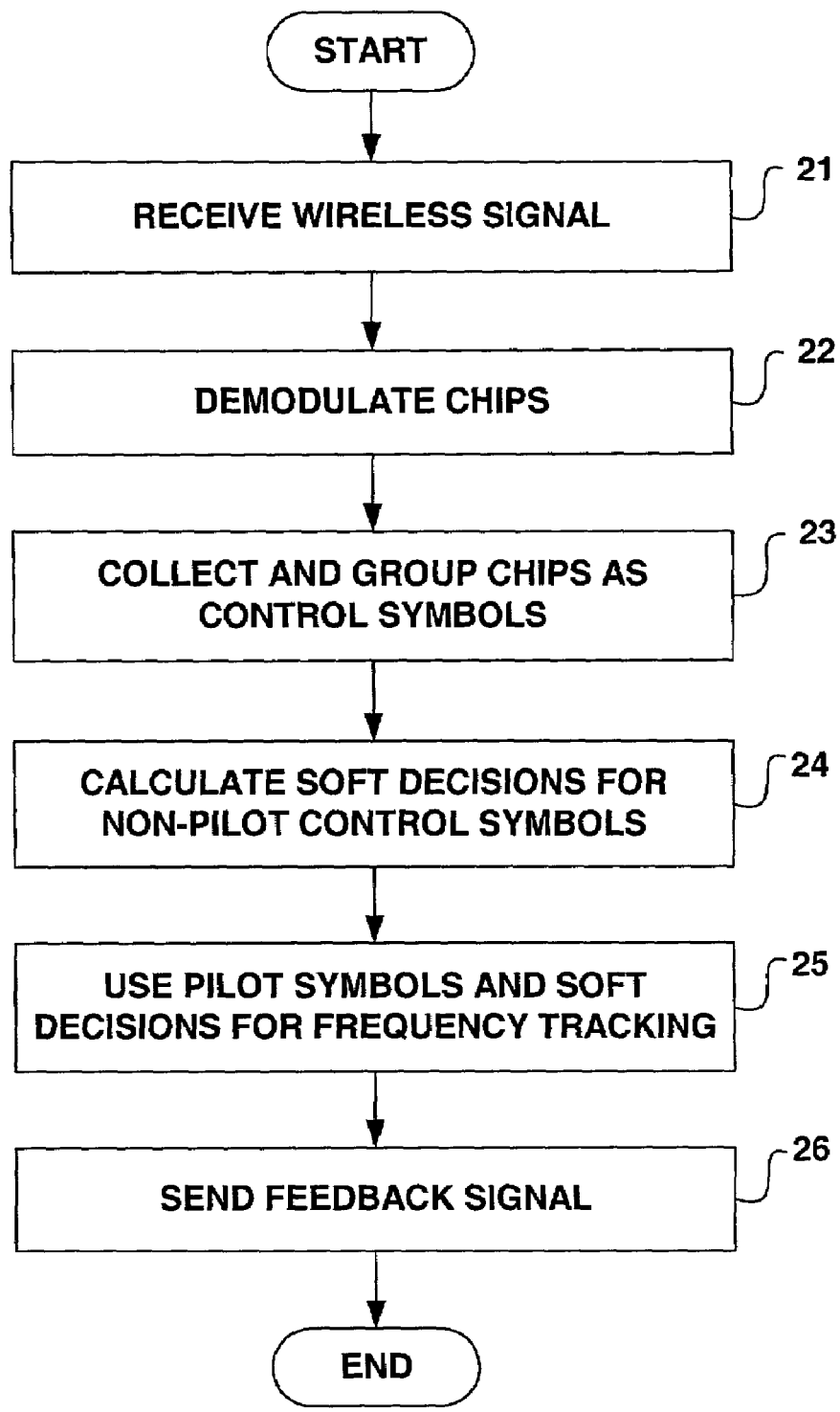
FIG. 2 is a flow diagram illustrating a frequency tracking technique according to the invention.

FIG. 2 is a flow diagram illustrating a frequency tracking technique that can be used to improve the frequency tracking of received signals in base station 4A or 4B (hereafter base station 4). Again, although the technique is described as being implemented in base station 4 to track and adjust signals received from WCD 6A, 6B or 6C (hereafter WCD 6), the invention can be implemented in any base station 4, or any WCD 6 within system 2.

As shown, base station 4 receives a wireless signal 12 (21). In particular, signal 12 may comprise the control channel signal of a CDMA communication system, and typically includes a train of pulses, which are referred to as "chips." As signal 12 is received, each chip is demodulated by base station 4 (22). For example, if signal 12 is a spread spectrum CDMA signal, demodulation may involve despreading of pseudo-noise (PN) codes and decovering of orthogonal codes for each chip (sometimes referred to as "Walsh decovering"). The results of demodulation are then collected and grouped into control symbols (23). For example, each control symbol may be obtained from a stream of 256 demodulated chips.

Control symbols can be categorized as either pilot symbols or non-pilot symbols. A "slot" refers to a group of control symbols, and typically includes ten control symbols, although the invention is not limited in that respect. For example, the pilot symbols typically make up the first few control symbols of a slot, and the remaining control symbols comprise various non-pilot symbols. As described in greater detail below, in accordance with the invention, frequency tracking of the incoming signal is performed using both the pilot and non-pilot symbols.

Pilot symbols refer to control symbols that are used to facilitate system synchronization. Conventionally, only the pilot symbols are used to provide time, frequency and/or phase tracking of transmitted signals. In accordance with the invention, however, the non-pilot symbols are also used in frequency tracking. Base station 4A can be programmed or designed to determine which symbols of a slot are the pilot symbols.

Non-pilot symbols refer to any other control symbols, i.e., control symbols that are not pilot symbols. For example, non-pilot symbols may include transport format combination indicators (TFC symbols) that convey information about how data is organized on the data channel, transmit power control indicators (TPC symbols) that convey power control commands, feedback indicators (FBI symbols) that convey various feedback information, data symbols transmitted on the control channel, or any other symbols that are not pilot symbols. Base station 4A may be programmed or designed to know which symbols of a slot correspond to which non-pilot symbols.

In accordance with the invention, soft decisions are calculated for each non-pilot symbol (24). The soft decisions can incorporate both a determination as to the value represented in the non-pilot symbols and a confidence factor associated with the non-pilot symbol. For example, as described in greater detail below, a hyperbolic tangent function or an approximation thereof can be used to generate the soft decisions. The pilot symbols and the soft decisions can then be used for frequency tracking (25). For example, in some embodiments, the pilot symbols and soft decisions can be used in one of a variety of different cross-multiplication operations to facilitate calculation of the residual frequency error estimate. Residual frequency error estimates can then be accumulated to provide an estimate of the frequency error associated with signal 12. Conventional frequency tracking techniques have ignored the non-pilot symbols for frequency tracking. The invention, however, uses the non-pilot symbols to generate soft decisions, which can be used with the pilot symbols to improve frequency tracking.

The accumulation of the residual frequency error estimates may continue indefinitely such that the residual frequency error converges to zero. The accumulated frequency error can also be sent as a feedback signal to a rotator within base station 4 (26). Alternatively, the accumulated frequency error can be accessed by the rotator within base station 4 as needed. In both cases, a closed-loop feedback system is established. In other words, pilot and non-pilot symbols which are demodulated from the signal are continuously used to determine residual frequency error estimates. The residual frequency error estimates accumulate toward a convergent estimate of the actual error of the signal. The accumulated estimate can then be continuously used by the rotator to adjust signal frequency accordingly.

Figure 3:
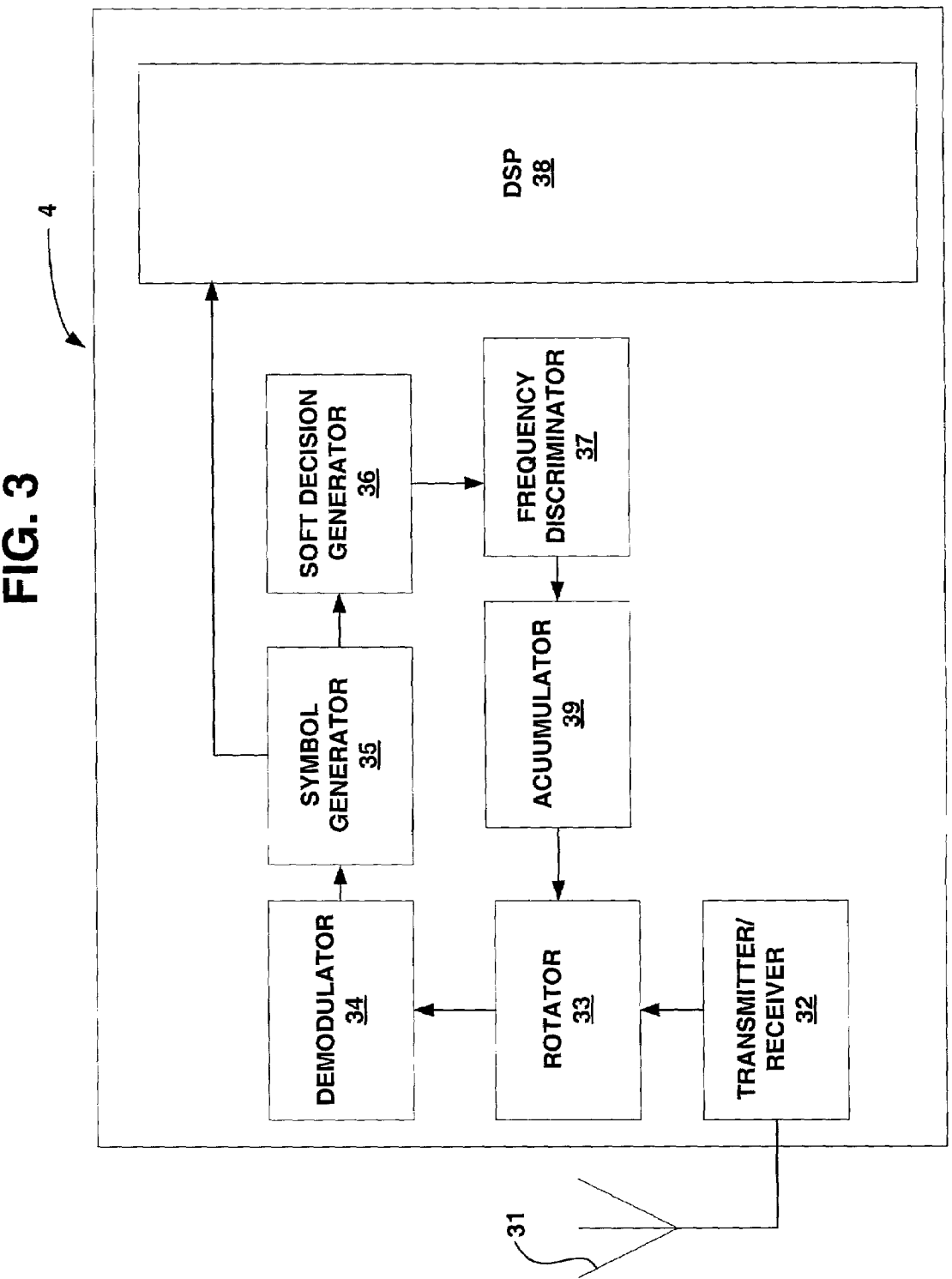
FIG. 3 is a block diagram illustrating exemplary hardware that can be used to implement various aspects of the invention.

FIG. 3 is a block diagram illustrating exemplary hardware that can be used to implement various aspects of the invention. Again, the hardware of FIG. 3 is described as forming part of base station 4; however, similar hardware could form part of WCD 6 to estimate frequency error and adjust signal frequency of signals received by WCD 6 accordingly. Base station 4 may be designed to support one or more wireless standards or designs, including for example, FDMA standards or designs, TDMA standards or designs, or CDMA standards or designs such as IS-95, IS-98, W-CDMA, CDMA2000, or the like.

As shown in FIG. 3, hardware of base station 4 may include a transmitter/receiver 32 (transceiver) coupled to antenna 31. When an incoming RF signal is received, such as a control channel signal of the CDMA communication system, transmitter/receiver 32 conditions the received signal, e.g., filters, amplifies and digitizes the signal, and then passes the digitized signal to rotator 33. Rotator 33 adjusts the frequency of the signal to account for frequency errors caused by variations in local clocks and Doppler shifts. As described in greater detail below, base station 4 implements a frequency tracking loop that uses both pilot and non-pilot symbols to estimate frequency error. Rotator 33 forms part of the frequency tracking loop, and specifically uses the estimated frequency error to adjust received signals accordingly.

After adjusting the frequency of the received signal, the signal is sent to demodulator 34. Demodulator 34 demodulates individual chips of the signal, such as by despreading PN codes and decovering orthogonal codes for each chip. The results of demodulation are then grouped into control symbols by symbol generator 35. Symbol generator 35 can then pass the control symbols to digital signal processor (DSP) 38, which performs symbol detection, decoding, or data recovery.

For W-CDMA, control symbols are typically defined by the following equations:

$$y_i = \begin{cases} A \cdot e^{j\varphi} + n_i & i = 1, \ldots, N_P \\ A \cdot e^{j\varphi} \cdot b_i + n_i & i = N_P + 1, \ldots, N_T \end{cases} \quad \text{Eq (1)}$$

where $y_i$ represents the control symbol, $N_T$ represents the number of control symbols in a slot, $N_P$ represents the number of pilot symbols in a slot, $A$ represents the channel amplitude, $\varphi$ represents the channel phase, $n_i$ is the channel noise having the properties of $n_i \sim CN(0, 2\sigma^2)$ and independent and identically distributed (IID), $b_i$ is the value of the non-pilot symbol (i.e., $b_i \in \{-1, 1\}$) and IID, and $j$ represents $\sqrt{-1}$.

Symbol generator 35 also passes the control symbols to soft decision generator 36. Soft decision generator 36 includes hardware that can identify and distinguish pilot and non-pilot symbols. For example, as discussed above, in W-CDMA the pilot symbols comprise the first few control symbols for a slot. In that case, soft decision generator 36 may identify the pilot symbols as those first control symbols of each slot. Soft decision generator 36 does not manipulate the pilot symbols, but simply passes them to frequency discriminator 37. However, for the non-control symbols, soft decision generator 36 manipulates each symbol to generate soft decisions. These soft decisions can then be passed to frequency discriminator 37 in place of the non-pilot symbols.

In particular, if soft decision generator 36 identifies a non-pilot symbol, it generates a soft decision that incorporates both a decision as to whether the symbol is a 1 or a −1 and a confidence level of the decision as to whether the symbol is a 1 or a −1. In this manner, the soft decisions passed to frequency discriminator 37 can be weighted according to the confidence level associated with the non-pilot symbols. For example, the confidence level may be a function of the power level associated with the received signal or a signal-to-noise plus interference ratio associated with the signal. In one particular example, the soft decisions are generated by applying a hyperbolic tangent function. In other embodiments, the soft decisions simply represent weighted non-pilot symbols. Additional details of soft decision generator are provided below.

Frequency discriminator 37 estimates the error associated with the received signal using the pilot symbols and soft decisions generated by soft decision generator 36. For example, in various embodiments, frequency discriminator 37 estimates the residual frequency error by cross-multiplying symbols and/or soft decisions to determine the phase difference between successive symbols. In some cases, frequency discriminator 37 cross-multiples sets of symbols and/or soft decisions to determine the phase difference. In particular, the sets of symbols and soft decisions can be defined in a manner that increases the pull in range of the frequency tracking loop. Alternatively, frequency discriminator 37 may estimate the residual frequency error using techniques other than cross-multiplication. For example, frequency discriminator 37 may estimate the residual frequency error by taking a fast Fourier transform (FFT) on the pilot symbols and soft decisions associated with the non-pilot symbols. In addition, other methods of estimating the residual frequency error may also be used by frequency discriminator 37. Importantly, because the non-pilot symbols are used, there may be no gaps between successive symbols, thus allowing sets of symbols and/or soft decisions to be defined in a manner that increases the pull-in range.

The cross-products, which represent residual frequency error estimates, are output by the frequency discriminator 37 and are accumulated by accumulator 39 to quantify an estimate of the actual frequency error associated with the received signal. In some cases, accumulator 39 issues a command to rotator 33 to instruct rotator 33 to adjust the frequency of the received signal accordingly, and in other cases, rotator 33 accesses frequency accumulator 39 to determine the proper frequency adjustment. Additional details of frequency discriminator 37 are provided below.

Figure 4:
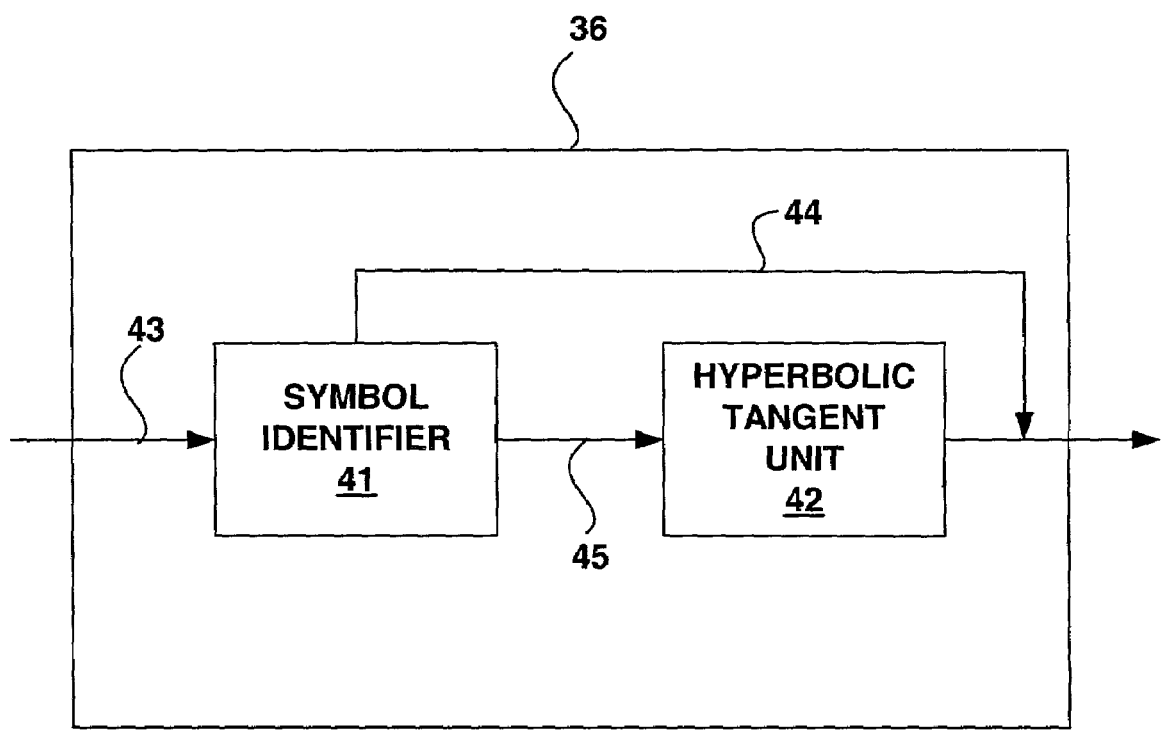
FIG. 4 is a block diagram illustrating details of an embodiment of a soft decision generator.

FIG. 4 is a more detailed block diagram illustrating one embodiment of soft decision generator 36. As shown in FIG. 4, soft decision generator 36 may include a symbol identifier 41 and a hyperbolic tangent unit 42. Symbol identifier 41 determines whether an incoming symbol (indicated at 43) is a pilot symbol or a non-pilot symbol. In some cases, symbol identifier 42 merely tracks symbols as they are received and identifies particular symbols for a given slot as pilot symbols. For example, in the reverse link control channel of W-CDMA, control symbols are grouped into slots that typically include 10 control symbols. The first few control symbols for each slot typically correspond to the pilot symbols. Thus, in that case, symbol identifier 42 can track incoming symbols to identify the first symbol of each slot, the pilot symbols for the slot, and the non-pilot symbols for the slot.

If an incoming symbol is a pilot symbol, it is fed out of soft decision generator 36 without any manipulation (as indicated at 44). However, if an incoming control symbol is a non-pilot symbol, it is sent to hyperbolic tangent unit 42 (as indicated at 45). Hyperbolic tangent unit 42 is one exemplary hardware unit that can manipulate the non-pilot symbols to generate soft decisions which incorporate both an indication of the value associated with the non-pilot symbols and a weight factor indicating a confidence level in the decision.

Hyperbolic tangent unit 42 receives the non-pilot symbols and performs a hyperbolic tangent operation (or an approximation thereof) on the non-pilot symbols. In particular, hyperbolic tangent unit 42 may perform the hyperbolic tangent operation according to the following equation:

$$\text{Soft decision of non-pilot symbol} = y_i \tanh(\text{Re}\{y_i^* A e^{j\varphi}/\sigma^2\}) \quad \text{Eq (2)}$$

In most cases, the exact values of A and $\varphi$, are not known at the receiver, so an estimate of $Ae^{j\varphi}$ can be used in the calculation of the hyperbolic tangent. That is, $$\text{Soft decision of non-pilot symbol} = \tanh(\text{Re}\{y_i^* f/\sigma^2\}), \quad \text{Eq (3)}$$

where f is an estimate of $Ae^{j\varphi}$ such as the output of a pilot filter. As a result of the hyperbolic tangent calculation, when the signal-to-noise plus interference ratio is high, i.e., $\sigma^2$ is a low value, there is greater likelihood that the non-pilot symbol was received correctly, and the symbol is weighted more, e.g., with weights approaching ±1.0. Conversely, when the signal-to-noise ratio is low, i.e., $\sigma^2$ is a high value, there is lower likelihood that the non-pilot symbol was received correctly, and the symbol is weighted less, e.g., with weights approaching ±0.0. Co-pending and commonly assigned U.S. application Ser. No. 09/826,130, filed Apr. 4, 2001, provides a detailed derivation of the hyperbolic tangent function:

$$\tanh(\text{Re}\{y_i^* A e^{j\varphi}/\sigma^2\})$$

for use in a pilot filter.

Figure 5:
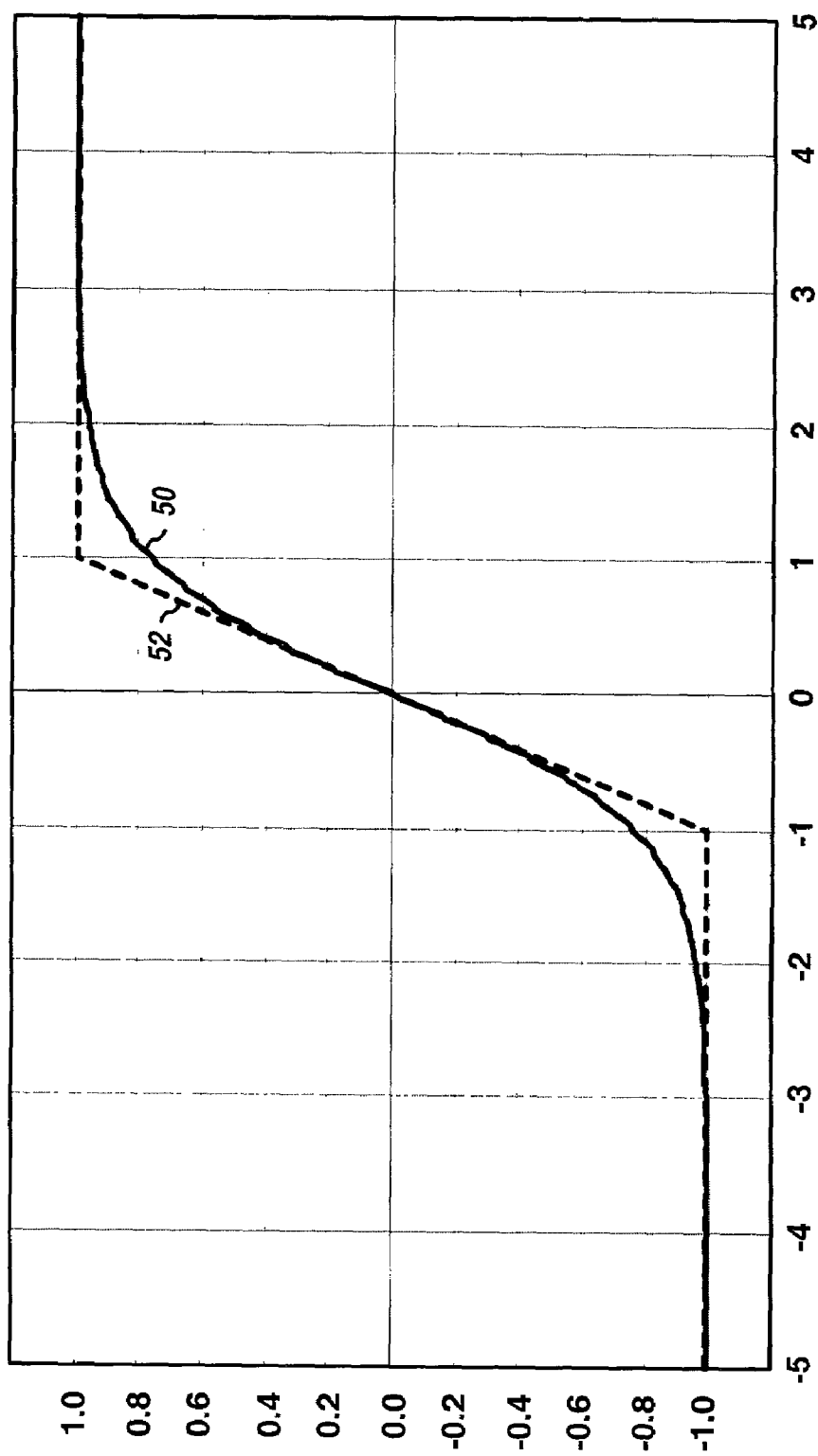
FIG. 5 is a graph of a result of a hyperbolic tangent operation and a suitable estimate of the hyperbolic tangent operation.

FIG. 5 is a graph of a hyperbolic tangent function that can be used to derive the soft decisions associated with the non-pilot symbols. The hyperbolic tangent function can be implemented in various manners, including algorithms implemented in hardware, software or firmware, or by using a lookup table. To reduce complexity, the hyperbolic tangent function 50 may be approximated with a piece-wise linear function 52.

To still further simplify the implementation of hyperbolic tangent unit 42, coefficients can be quantized to L bits, where L can be an integer selected to reduce complexity of multiplication operations in eq. (2). For example, L may be selected as five, and the coefficients may be quantized to nine possible values of +/−{0, ¼, ½, ¾, and 1}. The quantization of coefficients can greatly simplify the implementation of hyperbolic tangent unit 42. Simulations have shown that approximation of the hyperbolic tangent function with a piece-wise linear function and the quantization of coefficients to nine possible values degrade the performance of the frequency tracking loop by a negligible amount.

Figure 6:
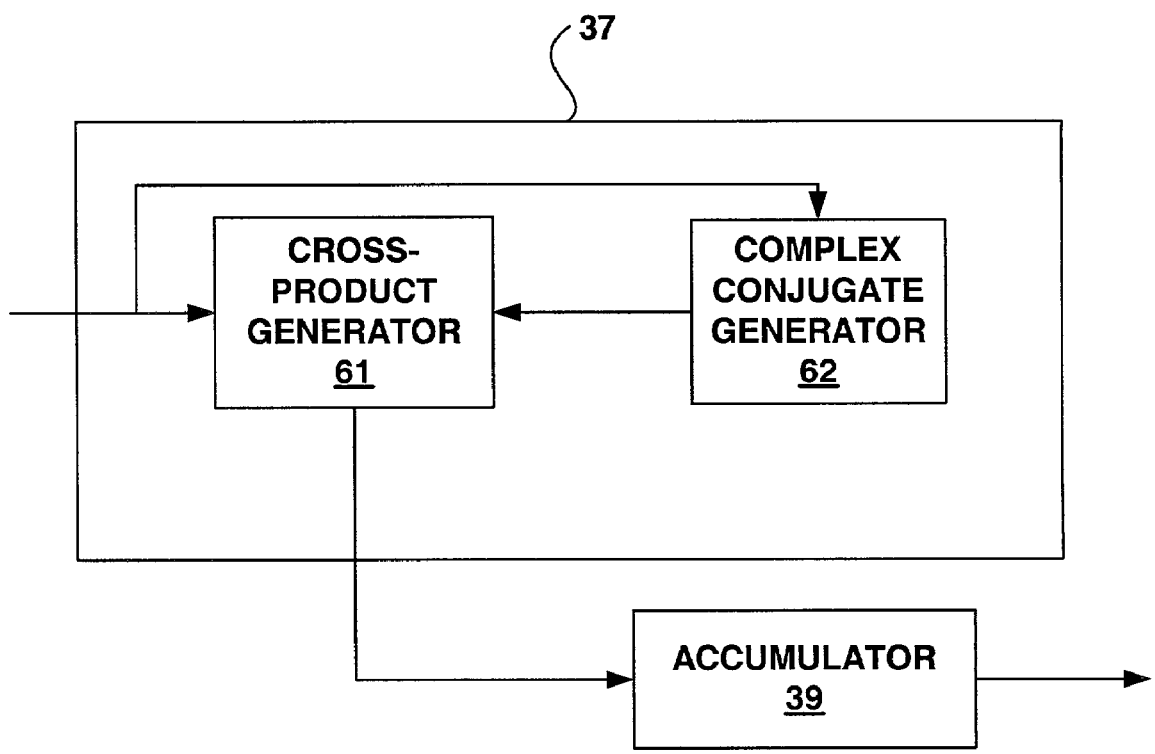
FIG. 6 is a block diagram further illustrating an embodiment of a frequency discriminator connected to an accumulator.

FIG. 6 is a more detailed block diagram illustrating one embodiment of frequency discriminator 37 and accumulator 39. In particular, frequency discriminator 37 may include a cross product generator 61 and a complex conjugate generator 62. Cross-product generator 61 cross-multiplies successive symbols or sets of successive symbols with the complex conjugates of previous symbols. Complex conjugate generator 62 generates the complex conjugates of incoming symbols for use in cross-product generator 61. The results of the cross-multiplication represent a phase differential between successive symbols or sets of successive symbols. The results of cross-product generator 61 are accumulated in accumulator 39 to maintain an ongoing estimate of the frequency error. The accumulated frequency error typically converges after a number of iterations through the frequency tracking loop. In other words, because rotator 33 adjusts the frequency of the received signal using the accumulated estimate, the accumulated estimate typically converges after an amount of time. This amount of time that it takes the frequency tracking loop to converge is referred to as the time constant of the frequency tracking loop. As mentioned above, in other embodiments frequency discriminator 37 may estimate the residual frequency error using techniques other than cross-multiplication. In that case, alternative hardware may replace cross-product generator 61 and complex conjugate generator 62 to implement the alternative technique.

Reducing the time constant is highly advantageous because it results in the received signal being adjusted to the proper frequency after a shorter amount of time. The invention can effectively increase the margin between the pull-in range and the maximum frequency error because it uses the non-pilot symbols rather than ignoring them. This, in turn, may result in a reduction of the time constant of the frequency tracking loop.

In some embodiments, accumulator 39 issues commands to rotator 33 according to the accumulated estimate of the frequency error. In other embodiments, accumulator 39 simply stores the accumulated estimate, and rotator 33 accesses the stored estimate as needed. In either case, performance of the frequency tracking loop is improved because the estimate is generated using both pilot and non-pilot symbols.

As mentioned above, cross-product generator 61 cross-multiplies successive symbols or sets of symbols with the complex conjugates of previous symbols. In particular, the cross-multiplication is performed using pilot symbols and soft decisions generated for the non-pilot symbols. For example, a slot of control symbols can be represented as:

$$Y_{P1}\ Y_{P2}\ Y_{P3}\ Y_{P4}\ Y_{P5}\ Y_{P6}\ Y_{NP1}\ Y_{NP2}\ Y_{NP3}\ Y_{NP4},$$

where $Y_{P1}$ to $Y_{P6}$ represent the pilot symbols and $Y_{NP1}$ to $Y_{NP4}$ represent the non-pilot symbols. After generating the soft decisions for the non-pilot symbols, as outlined above, let the soft decisions be represented as $Y'_{NP1}\ Y'_{NP2}\ Y'_{NP3}$ and $Y'_{NP4}$. Thus, the symbols (in this case pilot symbols and soft decisions for the non-pilot symbols) that are fed into cross-product generator can be represented as:

$$Y_{P1}\ Y_{P2}\ Y_{P3}\ Y_{P4}\ Y_{P5}\ Y_{P6}\ Y'_{NP1}\ Y'_{NP2}\ Y'_{NP3}\ Y'_{NP4}.$$

Cross-product generator 61 can be programmed or designed to perform any of a number of different cross-multiplications, depending on the implementation. For example, in one case, cross-product generator 61 performs $Y_{P2}(\times)Y_{P1}^*$, where $Y_{P1}^*$ represents the complex conjugate of $Y_{P1}$. In that case, cross-product generator 61 would also perform $Y_{P3}(\times)Y_{P2}^*$, and $Y_{P4}(\times)Y_{P3}^*$, and so forth.

In other examples, cross-product generator 61 can be programmed or designed to cross-multiply sets of symbols, such as $(Y_{P3}+Y_{P4})(\times)(Y_{P1}+Y_{P2})^*$, and $(Y_{P5}+Y_{P6})(\times)(Y_{P3}+Y_{P4})^*$, and $(Y'_{NP1}+Y'_{NP2})(\times)\ (Y_{P5}+Y_{P6})^*$, and so forth. Additionally, the sets of symbols that are cross-multiplied may have common symbols such as: $(Y_{P3}+Y_{P4}+Y_{P5})\ (\times)\ (Y_{P1}+Y_{P2}+Y_{P3})^*$, and $(Y_{P5}+Y_{P6}+Y_{NP1})\ (\times)\ (Y_{P3}+Y_{P4}+Y_{P5})^*$, and so forth. Any number of different sets could be defined for use by cross-product generator 61. Generally, by defining larger or more complex sets for use in the cross-multiplication, the standard deviation in the frequency tracking loop can be decreased. However, if these sets are not chosen properly, the time constant may be increased. Accordingly, sets of symbols could be optimally defined for any specific implementation with these variables in mind. Advantageously, because the invention uses the non-pilot symbols rather than ignoring them, the number of possible cross-products increases significantly. Moreover, because cross-product generator 61 receives a continuous stream of symbols that does not include any gaps, cross-product combinations can be defined so as to increase the pull-in range.

Figure 7:
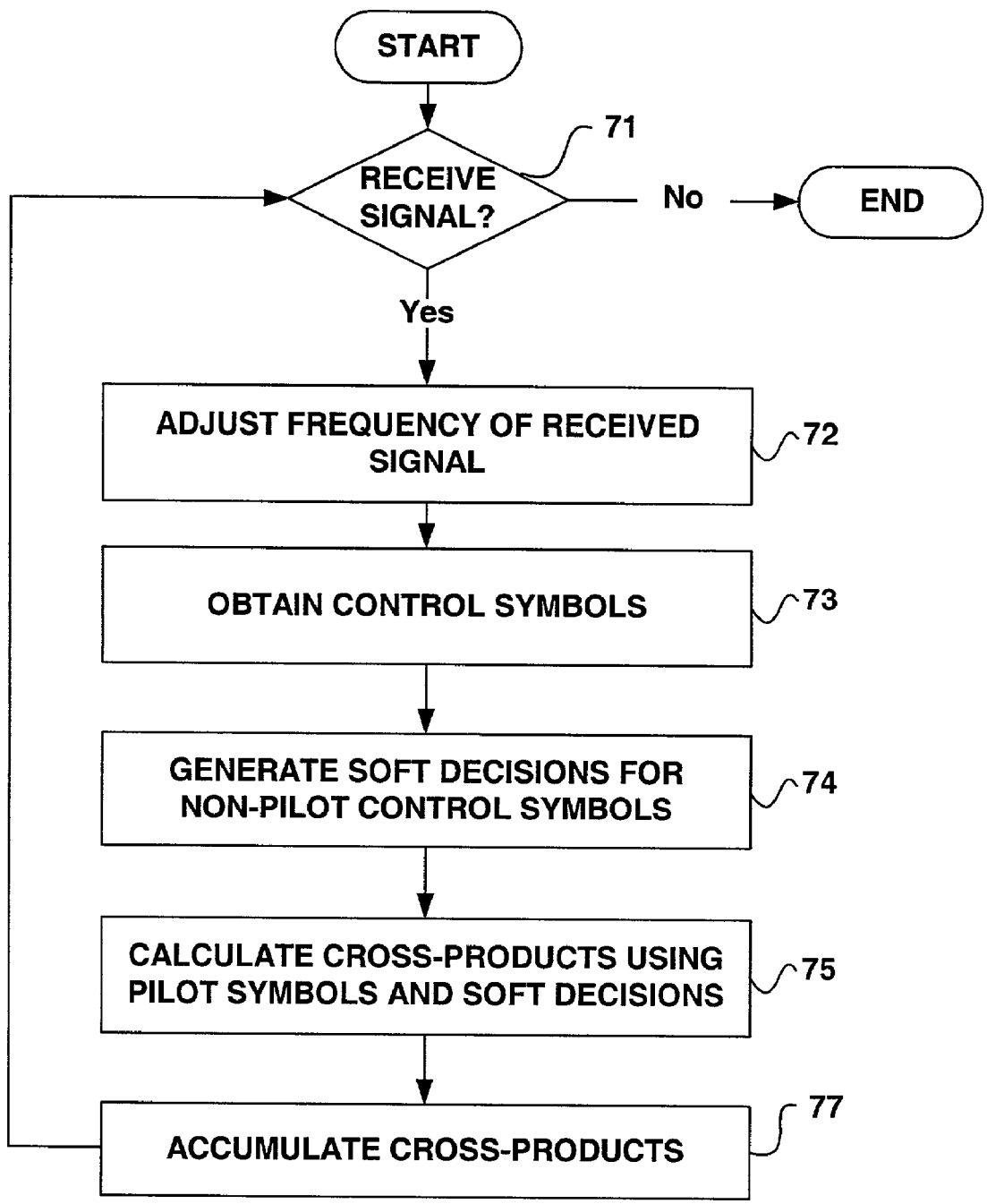
FIG. 7 is a flow diagram illustrating a frequency tracking technique according to the invention.

FIG. 7 is a flow diagram according to the invention. As shown, transmitter/receiver 32 receives a wireless signal captured by antenna 31 (71). Transmitter/receiver 32 may condition the signal by filtering, scaling, and/or digitizing the signal. Control symbols are then obtained, such as by demodulating the digital signal using demodulator 34 and generating symbols from the demodulated digital signal using symbol generator 35 (72). The control symbols may include both pilot and non-pilot symbols. Soft decision generator 36 then generates soft decisions for the non-pilot symbols (74). Cross-product generator 61 calculates cross-products using the pilot symbols and the soft decisions (75). The cross-products may be filtered, or the like, and then accumulated using accumulator 39 (77).

If the signal is still being received (71), then rotator 33 can adjust the frequency using the accumulated cross-products. For example, accumulator 39 may issue a command to rotator 33, or alternatively, rotator 33 may access a frequency estimate from accumulator 39. In either case, the frequency adjustment can be improved because the frequency tracking loop uses both pilot and non-pilot symbols to estimate the residual frequency errors in the signal.

Figure 8:
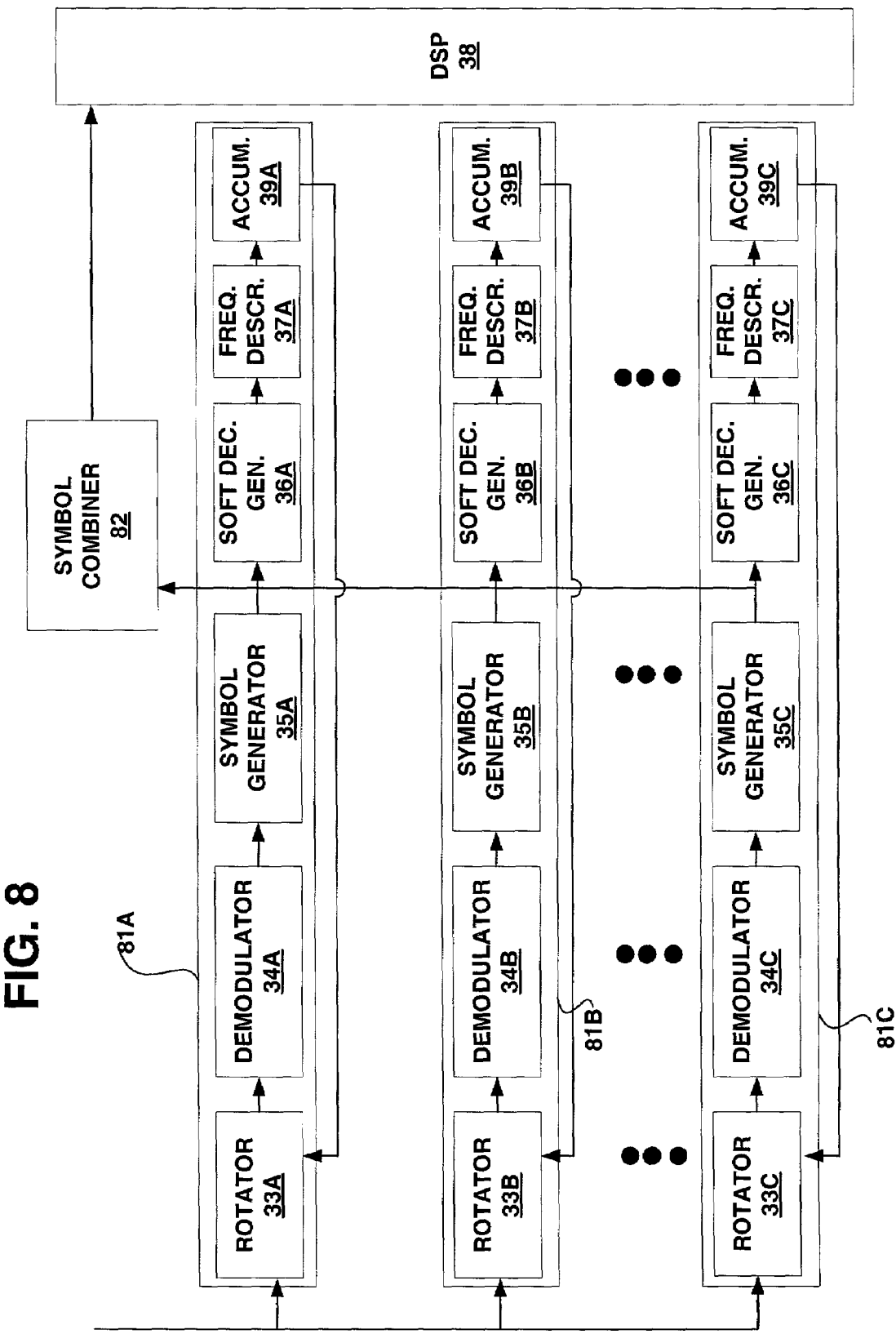
FIG. 8 is a block diagram illustrating exemplary hardware that can be used to implement various aspects of the invention within a RAKE receiver.

FIG. 8 is a more detailed block diagram of a portion of the hardware of base station 4, according to one embodiment of the invention. In particular, FIG. 4 illustrates hardware that forms part of a "RAKE receiver" that includes a number of "fingers" 81A–81C (hereafter fingers 81) to track different paths. The different paths tracked by the fingers of the RAKE receiver may correspond to the signals sent from different sources, or a signal sent from the same source but having been reflected off one or more objects, i.e., a multi-path signal. Each finger 81 may include its own demodulator 34A–34C that performs despreading and decovering of chips in signals corresponding to a given path. Each finger 81 may also include separate symbol generators 35A–35C for grouping chips into control symbols. These control symbols can be used in a number of ways. One use is to combine the symbols from symbol generators 35A–35C in symbol combiner 82, for example, to generate individual symbols for each source. Symbols for each source can then be sent to DSP 38 for control symbol detection or decoding, e.g. to detect the TPC bits or to decode the TFC bits.

In addition to sending the control symbols to symbol combiner 82, symbol generators 35A–35C also send the control symbols to soft decision generators (SOFT DEC. GEN. 36A–36C). Each soft decision generator 36 generates soft decisions for the non-pilot symbols for each finger. The soft decisions and pilot symbols can then be sent to frequency discriminators (FREQ. DESCR. 37A–37C) to calculate residual error estimates such as by cross-multiplication, and then sent to accumulators (ACCUM. 39A–39C) to be accumulated as described above. The accumulated estimates for each finger can then be used by rotators 33A–33C respectively to adjust for frequency errors in the signals tracked by the various fingers 81. In other words, each finger 81 of the RAKE receiver can implement the frequency tracking techniques according to the invention.

Figure 9:
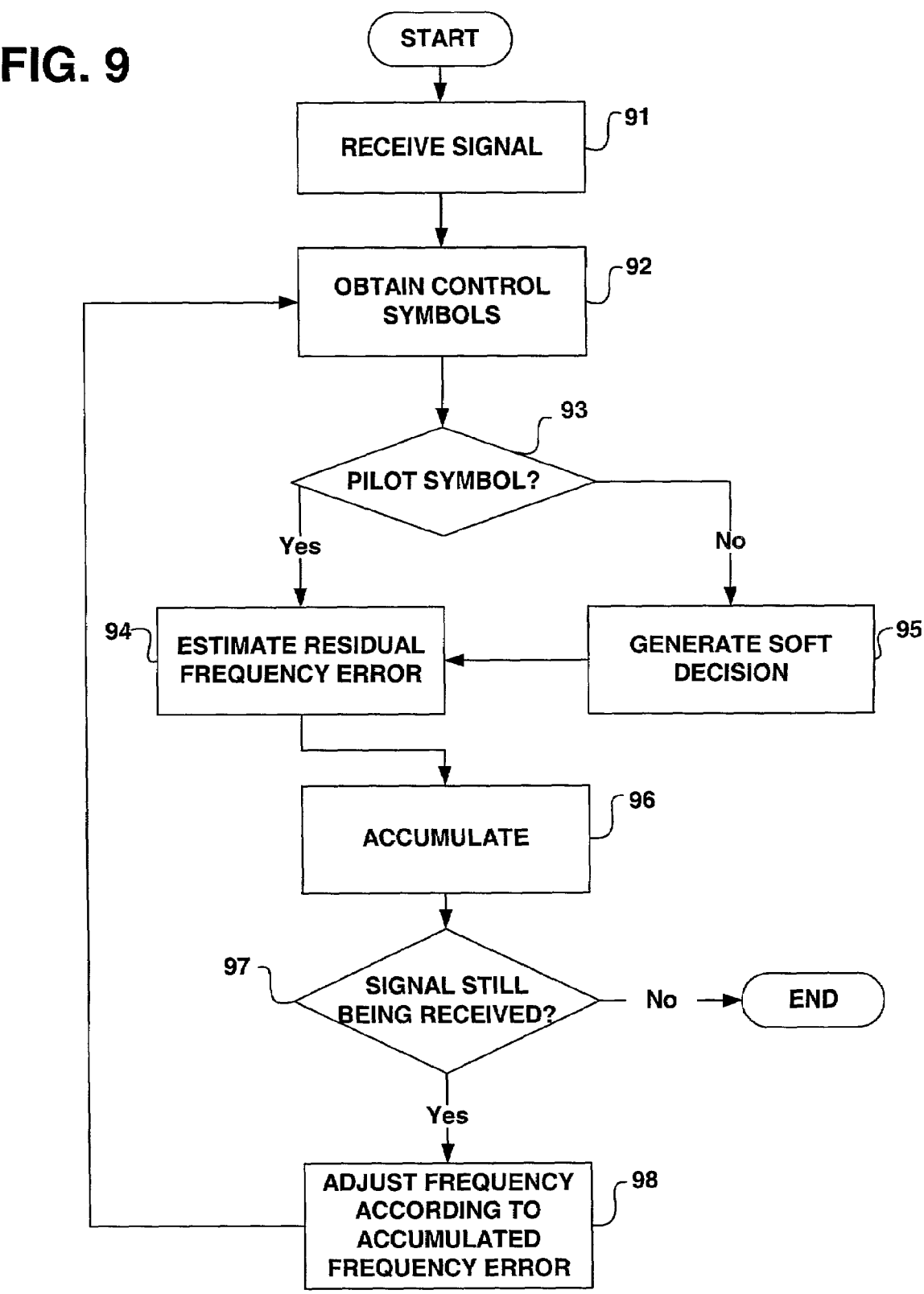
FIG. 9 is another flow diagram illustrating a frequency tracking technique according to the invention.

FIG. 9 is another flow diagram illustrating a frequency tracking technique according to the invention. As shown, a signal is received (91), and control symbols are obtained from the signal (92). For each control symbol, a determination is made, i.e., whether it is a pilot symbol or a non-pilot symbol (93). If a control symbol is a pilot symbol (93), it is directly used to estimate the residual frequency error (94). Non-pilot symbols are also used to estimate the residual frequency error, albeit indirectly. In particular, if a control symbol is a non-pilot symbol, a soft decision is generated (95), and the soft decision is used to estimate the residual frequency error (94). The soft decision can be generated in a number of ways, including for example, using the hyperbolic tangent function as outlined above. Other methods of generating the soft decision, may include using a sign function to determine whether the symbol represents a 1 or a −1 and assigning a weight to the determination. The weights can be assigned, for example, by accessing a lookup table having entries determined by simulations. Alternatively, the weights can be assigned using one or more constants, or by generating the weights via an algorithm.

After estimating the residual frequency error (94) the residual error is added to the accumulation of residual errors (96). This accumulation represents the estimate of the error in the received signal. If the signal is still being received (97), the frequency of the signal can be adjusted according to the accumulated frequency error (98). This process may continue indefinitely, until the signal is no longer being received (97). In other words, the invention can be implemented as a closed frequency tracking loop. The residual frequency error estimates can be accumulated so as to converge on the correct frequency adjustment value.

The various frequency tracking techniques have been described as being implemented in hardware. The techniques, however, could alternatively be implemented in software, firmware or any combination of hardware and software. If implemented in software, the techniques may be embodied in program code initially stored on a computer readable medium such as a hard drive or magnetic, optical, magneto-optic, phase-change, or other disk or tape media. For example, the program code can be loaded into memory and then executed in a processor. Alternatively, the program code may be loaded into memory from electronic computer-readable media such as EEPROM, or downloaded over a network connection. If downloaded, the program code may be initially embedded in a carrier wave or otherwise transmitted on an electromagnetic signal. The program code may be embodied as a feature in a program providing a wide range of functionality.

If the invention is implemented in program code, the processor that executes the program code may take the form of a microprocessor and can be The various frequency tracking techniques have been described as being implemented in hardware. The techniques, however, could alternatively be implemented in software, firmware or any combination of hardware and software. If implemented in software, the techniques may be embodied in program code initially stored on a computer readable medium such as a hard drive or magnetic, optical, magneto-optic, phase-change, or other disk or tape media. For example, the program code can be loaded into memory and then executed in a processor. Alternatively, the program code may be loaded into memory from electronic computer-readable media such as EEPROM, or downloaded over a network connection. If downloaded, the program code may be initially embedded in a carrier wave or otherwise transmitted on an electromagnetic signal. The program code may be embodied as a feature in a program providing a wide range of functionality.

If the invention is implemented in program code, the processor that executes the program code may take the form of a microprocessor and can be integrated with or form part of a wireless computer, a WCD, a base station, or the like. The memory may include random access memory (RAM) storing program code that is accessed and executed by a processor to carry out the various techniques described above.

Exemplary hardware implementations may include implementations within a DSP, an application specific integrated circuit (ASIC), a field programmable gate array (FPGA), a programmable logic device, specifically designed hardware components, or any combination thereof.

A number of embodiments of the invention have been described. For example, frequency tracking techniques have been described for use in a wireless communication system. Many aspects of the invention have been described as being carried out in a base station to track frequency error and adjust the frequency of a signal received by the base station. However, as mentioned above, the invention could also be implemented in any other device in the wireless communication system including, for example, a WCD. In W-CDMA, the control channel signal in the forward link from the base station to the WCD typically includes only pilot symbols, and thus, the use of both pilot and non-pilot symbols for frequency tracking would not be necessary in the forward link of W-CDMA. Other standards, such as standards yet to be developed, however, may include non-pilot symbols within the control channel signal in the forward link. In that case, the invention could improve frequency tracking of signals received by the WCD from the base station.

If the invention is implemented in a WCD, the frequency tracking techniques can be used both to adjust the frequency of incoming signals, and possibly also used as a closed feedback loop to the voltage controlled oscillator (VCO) of the WCD. The VCO is typically implemented by frequency synthesizers within the WCD to mix received signals down to baseband. If the control channel of the forward link includes non-pilot symbols, the frequency tracking techniques described herein could be implemented to improve the WCD by providing improved feedback to the VCO.

In addition, various other modifications may be made without departing from the spirit and scope of the invention. For example, various other components such as digital filters can be implemented within the frequency tracking loop to improve performance. Moreover, in some embodiments it may be advantageous to generate soft decisions for the pilot symbols to weight the pilot symbols accordingly. In addition, other techniques for calculating the soft decisions or weight factors on the pilot or non-pilot symbols could also be used. Also, the non-pilot symbols may include any of a variety of symbols, including for example, data symbols transferred over the control channel. Additionally, other methods of estimating the residual frequency error may be used instead of the cross-multiplication techniques described herein. Other wireless communication systems, including systems that do not use spread spectrum signals may also utilize the frequency tracking techniques described herein. Accordingly, these and other embodiments are within the scope of the following claims.

The invention claimed is:

1. A method comprising:
    obtaining control symbols from a first wireless signal, the control symbols including pilot symbols and non-pilot symbols;
    generating soft decisions for the non-pilot symbols; and
    using both the pilot symbols and the soft decisions for frequency tracking of the first wireless signal.

2. The method of claim 1, wherein generating soft decisions for the non pilot symbols comprises weighting each non-pilot symbol.

3. The method of claim 2, wherein the soft decisions comprise non-pilot symbols multiplied by a weight factor.

4. The method of claim 1, wherein using the pilot symbols and the soft decisions for frequency tracking includes calculating a cross-product to generate a residual frequency error estimate.

5. The method of claim 4, wherein calculating the cross-product comprises cross-multiplying one of the pilot symbols with a complex conjugate of one of the soft decisions.

6. The method of claim 4, wherein calculating the cross-product comprises cross-multiplying one of the soft decisions with a complex conjugate of one of the pilot symbols.

7. The method of claim 4, wherein calculating the cross-product comprises cross-multiplying a first set of the pilot symbols and soft decisions with a complex conjugate of a second set of the pilot symbols and soft decisions.

8. The method of claim 7, wherein the first set and the second set include at least one common symbol.

9. The method of claim 8, wherein the common symbol is a first symbol in the first set and a last symbol in the second set.

10. The method of claim 1, further comprising adjusting frequency of the first wireless signal in response to the frequency tracking.

11. The method of claim 1, wherein the soft decisions include a decision as to whether the symbol is a 1 or a −1 and a confidence level of the decision as to whether the symbol is a 1 or a −1.

12. The method of claim 1, wherein generating the soft decision includes applying a hyperbolic tangent function to calculate the soft decision.

13. The method of claim 1, wherein generating the soft decision includes applying an approximation of a hyperbolic tangent function to calculate the soft decision.

14. The method of claim 1, wherein generating the soft decision includes using a sign function to calculate a decision as to whether the non-pilot symbol is a 1 or a −1.

15. The method of claim 1, wherein the first wireless signal is a spread spectrum CDMA signal.

16. The method of claim 2, wherein weighing each non-pilot symbol includes weighing each non-pilot symbol according to strength of the first wireless signal.

17. The method of claim 2, wherein weighing each non-pilot symbol includes weighing each non-pilot symbol according to a signal-to-noise-plus interference ratio associated with the first wireless signal.

18. The method of claim 4, further comprising calculating cross-products to calculate residual frequency error estimates and accumulating the cross-products to calculate an estimated frequency error of the first wireless signal.

19. The method of claim 1, wherein the non-pilot symbols include transport format combination indicators, transmit power control indicators and feedback indicators.

20. A method comprising:
obtaining control symbols from a first wireless signal, the control symbols including pilot symbols and non-pilot symbols;
assigning a weight factor to each non-pilot symbol; and
using the pilot symbols and weighted non-pilot symbols for frequency tracking of the first wireless signal.

21. A computer-readable medium carrying program code that when executed:
obtains control symbols from a first wireless signal, the control symbols including pilot symbols and non-pilot symbols;
generates soft decisions for the non-pilot symbols; and
uses the pilot symbols and the soft decisions for frequency tracking of the first wireless signal.

22. An apparatus comprising:
a rotator that adjusts signal frequency of a signal;
a soft decision generator that determines soft decisions for non-pilot symbols; and
a feedback loop to the rotator and the soft decision generator that provides an estimate of a frequency error associated with the signal, wherein the feedback loop generates the estimate of the frequency error using pilot symbols and soft decisions.

23. The apparatus of claim 22, further comprising:
a transmitter/receiver that receives and conditions the signal before sending the signal to the rotator;
a demodulator that demodulates the signal after the rotator has adjusted signal frequency of the signal;
a symbol generator that obtains the pilot and non-pilot symbols; and
a digital signal processor that processes the pilot and non-pilot symbols.

24. The apparatus of claim 22, wherein the feedback loop includes a frequency discriminator and an accumulator, wherein the frequency discriminator calculates residual frequency error estimates using the pilot and non-pilot symbols and sends the residual frequency error estimates to the accumulator to generate the estimate of the frequency error.

25. The apparatus of claim 24, wherein the soft decision generator includes a hyperbolic tangent unit that generates the soft decisions.

26. The apparatus of claim 24, wherein the frequency discriminator includes a cross-product generator to estimate residual frequency errors.

27. The apparatus of claim 22, wherein the apparatus forms part of a RAKE receiver, the apparatus further comprising:
a number of rotators that adjust signal frequency of a number of signals tracked by a number of fingers; and
a number of feedback loops to the number of rotators that provide estimates of frequency errors associated with the signals, wherein the feedback loops generate the estimates of the frequency errors using pilot and non-pilot symbols.

28. An apparatus comprising:
an antenna;
a transmitter/receiver coupled to the antenna that receives a signal and conditions the signal;
a rotator coupled to the transmitter/receiver that adjusts frequency of the signal;
a demodulator coupled to the rotator that demodulates the signal;
a symbol generator coupled to the demodulator that obtains control symbols from the demodulated signal, the control symbols including pilot and non pilot symbols;
a soft decision generator coupled to the symbol generator that generates soft decisions for the non-pilot symbols;
a frequency discriminator coupled to the soft decision generator that calculates residual frequency error estimates using the pilot symbols and the soft decisions; and
an accumulator coupled to the frequency discriminator and the rotator that accumulates an error estimate associated with the signal, wherein the rotator adjusts frequency of the signal based on the error estimate associated with the signal.

29. The apparatus of claim 28, wherein the apparatus forms part of a RAKE receiver, the apparatus further comprising:

a number of fingers that track a number of signals, wherein each finger includes a rotator, a demodulator coupled to the rotator, a symbol generator coupled to the demodulator, a soft decision generator coupled to the symbols generator, a frequency discriminator coupled to the soft decision generator, and an accumulator coupled to the frequency discriminator and the rotator.

* * * * *